(12) United States Patent
Hawk

(10) Patent No.: US 6,526,905 B2
(45) Date of Patent: Mar. 4, 2003

(54) SELF-CONTAINED OBSTRUCTION MARKER

(76) Inventor: Robert Hawk, 10721 Fincher Rd., Argyle, TX (US) 76226

(*) Notice: Subject to any disclaimer, the term of this patent is extended or adjusted under 35 U.S.C. 154(b) by 8 days.

(21) Appl. No.: 09/732,808

(22) Filed: Dec. 11, 2000

(65) Prior Publication Data

US 2002/0069814 A1 Jun. 13, 2002

(51) Int. Cl.[7] ............................................. F21S 13/08
(52) U.S. Cl. .......... 116/209; 116/DIG. 5; 116/DIG. 33; 116/202
(58) Field of Search .................. 116/209, DIG. 33, 116/200, 202, DIG. 5

(56) References Cited

U.S. PATENT DOCUMENTS

| | | | | |
|---|---|---|---|---|
| 3,926,141 A | * | 12/1975 | Taylor | 116/209 |
| 4,478,169 A | * | 10/1984 | Shrefler | 116/209 |
| 4,873,374 A | * | 10/1989 | Parmely et al. | 116/22 A |
| 4,876,674 A | * | 10/1989 | Parmely et al. | 116/22 A |
| 4,885,835 A | * | 12/1989 | Osgood | 116/209 |
| 5,208,577 A | * | 5/1993 | Herzberg | 116/DIG. 33 |
| 5,964,180 A | * | 10/1999 | De Gabriele et al. | 116/209 |

FOREIGN PATENT DOCUMENTS

| | | | | |
|---|---|---|---|---|
| DE | | 4220148 A1 | * 12/1993 | 116/202 |
| JP | | 58007912 A | * 1/1983 | 116/DIG. 33 |

* cited by examiner

Primary Examiner—Diego Gutierrez
Assistant Examiner—Travis Reis
(74) Attorney, Agent, or Firm—John E. Vandigriff

(57) ABSTRACT

A self powered spheriacal marker is mounted on a power line by extending the line though opposite openings in the marker. There are two sets of opposite openings to allow the marker to be oriented so that solar cells mounted on the exterior of the marker face a southernly direction. A battery inside the marker is maintained in a charged condition by the solar cells and power led lights that flash intermittently so as to draw attention to the marker. Two halves of the marker are secured together by pin-latch fasteners that are placed around shoulders extending around the periphery of the marker.

7 Claims, 3 Drawing Sheets

SELF-CONTAINED OBSTRUCTION MARKER

FIELD OF THE INVENTION

The invention is to an obstruction marker, and more particularly to a self-contained, self powered marker.

BACKGROUND OF THE INVENTION

Markers are used to highlight structures when it is impractical to make them conspicuous by painting. Markers may also be used in addition to aviation orange and white paint when additional conspicuity is necessary for aviation safety. They should be displayed in conspicuous positions on or adjacent to the structures so as to retain general definition of the structure. They should be recognizable in clear air from a distance of at least 4,000 feet (1219 m) and in all directions from which aircraft are likely to approach. Markers should be distinctively shaped, i.e. spherical, cylindrical, so they are not mistaken for items that are used to convey other information.

Spherical markers are used to identify overhead wires. Markers may be of another shape, i.e., cylindrical, provided the projected area of such markers will not be less than that presented by a spherical marker.

The diameter of the markers used on extensive catenary wires across canyons, lakes, rivers, etc., should be not less than 36 inches (91 cm). Smaller 20-inch (51 cm) spheres are permitted on less extensive power lines or on power lines below 50 feet (15 m) above the ground and within 1,500 feet (458 m) of an airport runway end. Each marker should be a solid color such as aviation orange, white, or yellow.

Markers should be spaced equally along the wire at intervals of approximately 200 feet (61 m) or fraction thereof. Intervals between markers should be less in critical areas near runway ends (i.e., 30 to 50 feet). They should be displayed on the highest wire or by another means at the same height as the highest wire. Where there is more than one wire at the highest point, the markers may be installed alternately along each wire if the distance between adjacent markers meets the spacing standard. This method allows the weight and wind loading factors to be distributed.

An alternating color scheme provides the most conspicuity against all backgrounds. Mark overhead wires by alternating solid colored markers of aviation orange, white, and yellow. Normally, an orange sphere is placed at each end of a line and the spacing is adjusted (not to exceed 200 feet) to accommodate the rest of the markers. When less than four markers are used, they should all be aviation orange.

Lighted markers are used for increased night conspicuity of high-voltage (69 KV or higher) transmission line catenary wires. These markers are used on transmission line catenary wires near airports, heliports, across rivers, canyons, lakes, etc. Lighted markers should be recognizable from a minimum distance of 4,000 feet (1219 m) under nighttime, minimum VFR conditions or having a minimum intensity of at least 32.5 candela. The lighting unit normally emit a steady burning red light. They should be used on the highest energized line. If the markers are installed on a line other than the highest catenary, then spherical markers are should be used in addition to the lighted markers. (The maximum distance between the line energizing the lighted markers and the highest catenary above the lighted marker should be more than 20 feet.) Markers should be distinctively shaped, i.e., spherical, cylindrical, so they are not mistaken for items that are used to convey other information. They should be visible in all directions from which aircraft are likely to approach.

If lighted markers are installed on a line other than the highest catenary, then spherical markers should be used in addition to the lighted markers. The maximum distance between the line energizing the lighted markers and the highest catenary above the lighted markers should be no more than 20 feet. The lighted markers may be installed alternately along each wire if the distance between adjacent markers meets the spacing standard. This method allows the weight and wind loading factors to be distributed.

U.S. Pat. No. 4,885,835 describes a method of assembling a line marker. The marker illustrated is a spherical ball including two hemi-spherical shells that are joined together with the power-line extending though the assembled shells.

U.S. Pat. No. 5,224,440 describes a clamshell hinging marker for mounting on overhead lines. It is similar to the structure of U.S. Pat. No. 4,885,835, in that it is a spherical ball including two hemispherical shells that are joined together with the power-line extending though the assembled shells.

U.S. Pat. No. 5,351,032 describes a visual and audio warning system that is used on power lines and utilizes a plurality of colored warning balls with an RF transmitter within one of the balls.

U.S. Pat. No. 4,474,133 describes an aircraft warning marker that is suspended from a high voltage wire.

SUMMARY OF THE INVENTION

The invention is a self powered spherical marker that is mounted on a wire, such as a wire on power lines, support cables, and fences by extending the wire on which the marker is to be mounted line though opposite openings in the marker. There are two sets of opposite openings to allow the marker to be oriented so that solar cells mounted on the exterior of the marker face a southernly direction. A battery inside the marker is maintained in a charged condition by the solar cells and power led lights that flash intermittently so as to draw attention to the marker. Two halves of the marker are secured together by a pin-latch fasteners that are placed around a shoulder extending around the periphery of the marker.

BRIEF DESCRIPTIONS OF THE DRAWINGS

DESCRIPTION OF A PREFERRED EMBODIMENT

Figure 1:
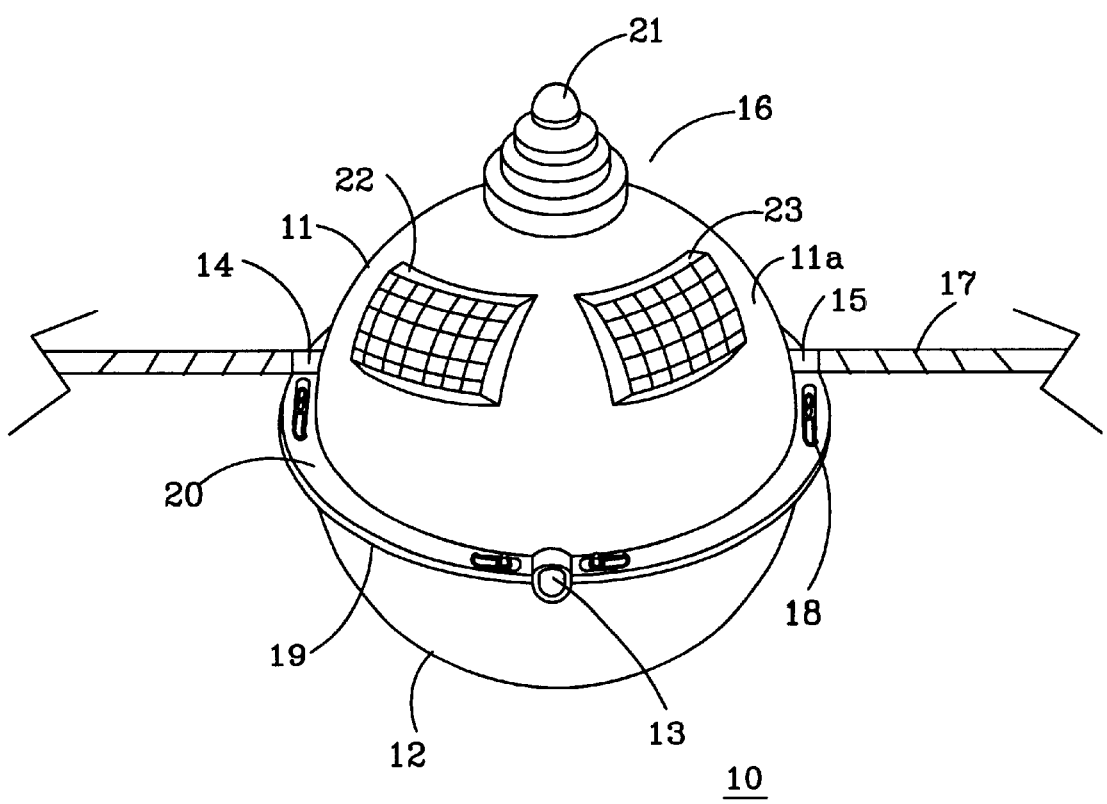
FIG. 1 is an isometric drawing of the marker according to the invention.

The invention is a self powered spherical marker 10 that is mounted on a power or bracing/stabilizing line 17 by extending the line 17 though opposite openings 14, 15 (or 13, 16) in marker 10. There are two sets of opposite openings 14 and 15, and 13 and 16 to allow the marker to be oriented so that solar cells 22, 23 mounted on the exterior surface 11a of the marker face a southernly direction. A battery inside the marker is maintained in a charged condition by the solar cells 22 and 23, and power a light assembly 21 that flashes intermittently so as to draw attention to marker 10.

Two halves 11, 12 of the marker 10 are secured together by pin-latch fasteners 18 that are placed around shoulders 19, 20 extend around the periphery of the marker 10.

As illustrated in FIG. 1, marker 10 is attached on cable/power line 17, with the cable extending through marker 10 through openings 14 and 15. The two halves 11 and 12 of marker 10 are held together by the fasteners 18. In this manner, marker 10 is clamped to cable 17. A water plug 24 may be inserted in two of 13a, 14a, 15a and 16a, the two not used for mounting on a cable, wire, or power line.

Figure 2:
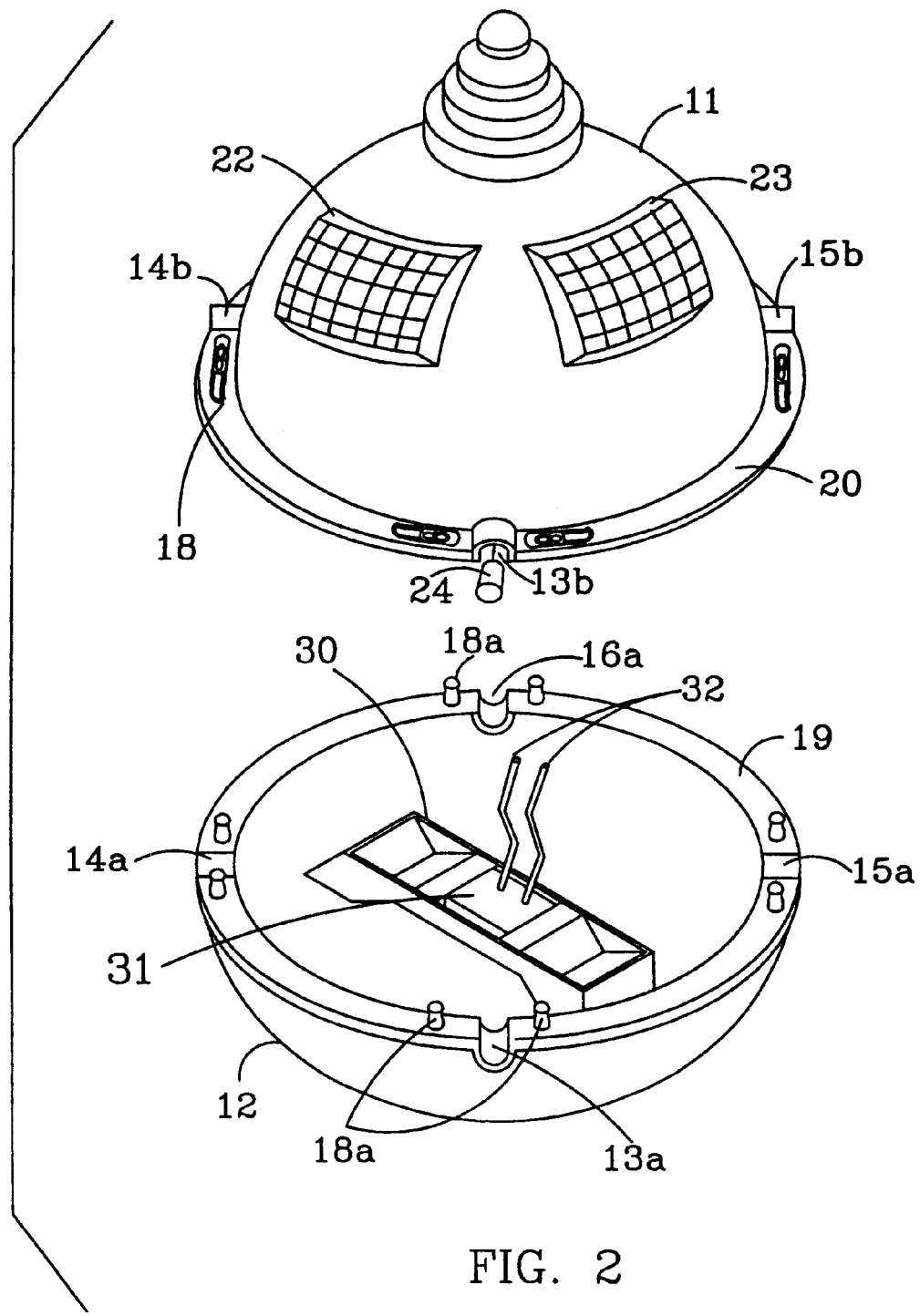
FIG. 2 is an exploded view of the marker.

FIG. 2 is an exploded view of marker 10 showing the two parts of the spherical shell. The bottom part 12 of marker 10 has shoulder 19 around the periphery of part 12, and has openings 13a–16a, each of which is a part of opening 13–16, through which the cable on which the marker is mounted passes. On each side of each opening 13a–16a, is a stud 18a which is a part of fastener 18. When the marker is mounted on a cable, studs 18a extend upward through its respective fastener 18 and holding the two parts of marker 10 securely together.

Top part 11 has a light housing 21 secured to its top surface, and encloses one or more lights. Solar cell arrays 22 and 23 are mounted on top 11 so that one is on each side of opening 13 through which a cable passes. By having an opening at 90° points around the shoulders 19 and 20, the marker can be mounted on a cable so that the solar cells are facing in a southernly direction insuring that the solar cells always approximately face the sun. Shoulder 20 extends around the top with openings 13b–16b (16b not directly shown) so that they correspond with the positions of openings 13a–16a.

Battery mount 30 is secured to the inside bottom of bottom part 12. Battery 31 is mounted in mount 30, with two conductors 32 connected to battery 31 and the light control/charging system illustrated in FIG. 3.

Figure 3:
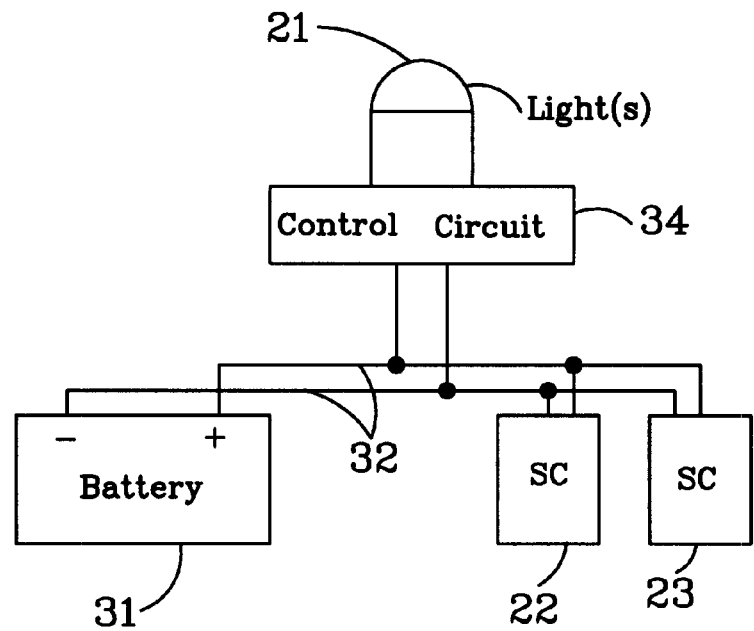
FIG. 3 is a control circuit for the marker.

FIG. 3 shows a basic control circuit that can be used with marker 10. Light(s) 21 are alternately turned on and off by control circuit 34 to present a blinking light. Light 21 may be make up of several LED light which are low power, long lasting lights and may be intermittently turned on and off without damage to the lights. Control circuit 34 may be, for example, the Universal LED Control Circuit Board made by Tertep Lamp Company (address). This control board is used with warning lights that are battery/solar powered and are switchable to steady or flashing lights. It will control one or more LEDs. Battery 31 may be, for example, a Guardian DG 6-5, manufactured Guardian (address). The control circuit may have a light sensor to turn the lights off during the day to preserve the battery and to allow full charge by the solar cells during the light hours.

Figure 4:
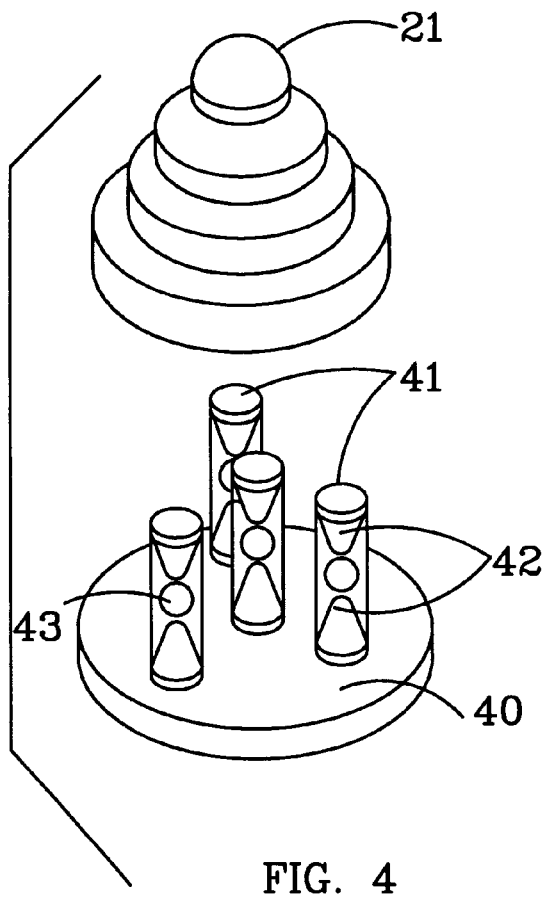
FIG. 4 is an exploded view of an example of a light.

FIG. 4 is an exploded view of light assembly 21 showing the base 40 with four LED lights 41 mounted thereon. Each light 41, for example, may have a reflector spherical ball 43 mounted between two LED lights 42. This allows a 360° light pattern from each light 41, radiating a 360° light pattern from the light assembly 21.

What is claimed is:

1. An avoidance marker, comprising:

a shell having first and second parts;

light mounted on said first part;

a control circuit mounted within said shell for turning said light alternately on and off to provide a flashing of the light;

a battery within the shell for providing power to the control circuit and light; and at least one solar cell array for charging said battery, said shell having two sets of opposite openings to allow the marker to be oriented so that said at least one solar cell array mounted on the exterior of the marker faces a southerly direction.

2. The avoidance marker according to claim 1, wherein said first and second parts have shoulders thereon, and are joined at the shoulders.

3. The avoidance marker according to claim 1, wherein said openings are spaced at 90° intervals around said marker.

4. The control circuit according to claim 1, including a light sensor to place the lights in an off condition during daylight.

5. An avoidance marker, comprising:

a shell having first and second parts, said first and second parts have shoulders thereon, a plurality of openings spaced at 90° intervals around said marker for mounting said marker on cables and power transmission wires, and are joined at the shoulders by pin and slide fasteners;

a light mounted on said first part;

a control circuit mounted within said shell for turning said light alternately on and off to provide a flashing of the light;

a battery for providing power to the control circuit and light; and at least one solar cell array for charging said battery.

6. The avoidance-marker according to claim 5, wherein said light is at least one LED light.

7. The control circuit according to claim 5, including a light sensor to place the lights in an off condition during daylight.

* * * * *